(12) United States Patent
Zhong et al.

(10) Patent No.: US 12,418,455 B2
(45) Date of Patent: Sep. 16, 2025

(54) MERGING CONFIGURATIONS OF NETWORK DEVICES

(71) Applicant: Arista Networks, Inc., Santa Clara, CA (US)

(72) Inventors: Hua Zhong, San Jose, CA (US); Diego Alfredo Asturias, Mountain View, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 237 days.

(21) Appl. No.: 18/071,826

(22) Filed: Nov. 30, 2022

(65) Prior Publication Data

US 2024/0179057 A1   May 30, 2024

(51) Int. Cl.
*H04L 41/082* (2022.01)
*H04L 41/0853* (2022.01)
*H04L 41/0859* (2022.01)

(52) U.S. Cl.
CPC ........ *H04L 41/082* (2013.01); *H04L 41/0856* (2013.01); *H04L 41/0863* (2013.01)

(58) Field of Classification Search
CPC ............... H04L 41/082; H04L 41/0856; H04L 41/0863
See application file for complete search history.

(56) References Cited

U.S. PATENT DOCUMENTS

| | | | |
|---|---|---|---|
| 2006/0007944 A1* | 1/2006 | Movassaghi | H04L 41/0813 370/401 |
| 2018/0011824 A1* | 1/2018 | Goldstein | G06F 40/103 |
| 2018/0024890 A1* | 1/2018 | Letkeman | G06F 11/1464 707/641 |
| 2021/0119871 A1* | 4/2021 | Page | H04L 41/0894 |
| 2022/0045898 A1* | 2/2022 | A | H04L 41/0631 |
| 2022/0217052 A1* | 7/2022 | Mutnuru | H04L 41/12 |
| 2023/0297475 A1* | 9/2023 | Gowda | G06F 11/0793 714/3 |

* cited by examiner

*Primary Examiner* — Kamal B Divecha
*Assistant Examiner* — Sujana Khakural
(74) *Attorney, Agent, or Firm* — Sprinkle IP Law Group

(57) ABSTRACT

Systems and methods for merging configurations on network devices based on structured models representing features to be configured are disclosed. By utilizing these structured models embodiments may generally allow configuration merges to be performed substantially on a per feature basis and also allow the merging to be performed in a manner that minimizes conflicts and implementation complexity while substantially improving the performance of those configuration merges.

20 Claims, 6 Drawing Sheets

MERGING CONFIGURATIONS OF NETWORK DEVICES

BACKGROUND

The configurations of network devices which control the flow of packets in a network, such as a router or switch, may be quite intricate, including thousands (or more) of individual features. Typically the configuration of these individual features may be accomplished through interaction with an interface of the network device. A user can input commands for configuring one or more features through the interface and the features may be configured accordingly at the network device.

As may be imagined, configuring such network devices can be time consuming and complex. Additionally, certain problems related to issues of synchronization between various configurations of the network device may arise. For example, in most cases there are no restrictions on the number of users who may perform such configurations or the timing of such configurations. Moreover, there is usually no effective way of reconciling these configuration changes. Accordingly, configurations by one user may overwrite, or otherwise replace or negate, changes to the configuration made by another user.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1A:
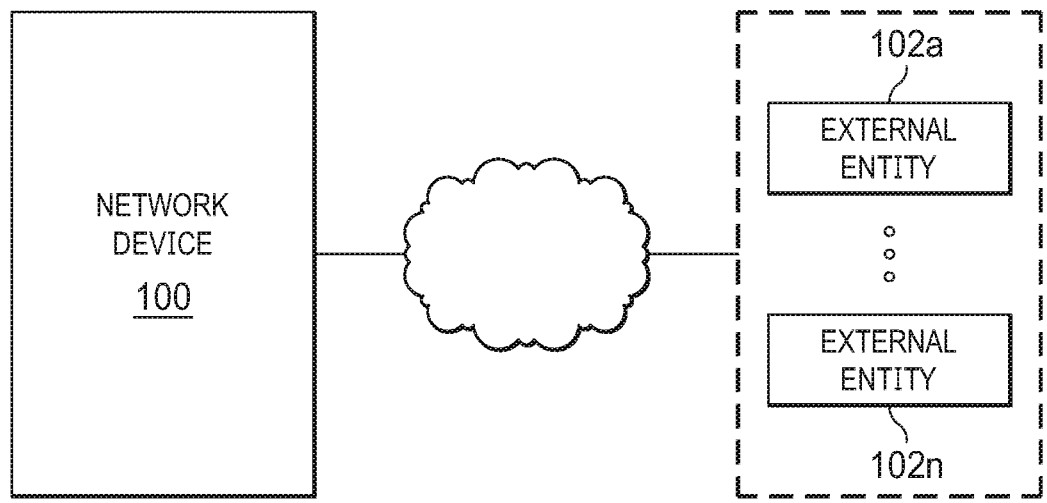
FIG. 1A is a block diagram of a network system including an embodiment of a network device for merging configurations.

As discussed, the configurations of network devices, such as a router or switch, may be quite intricate, including a large number of individual features (e.g., parameters, variables, etc.). At a fundamental level the configuration of these individual features may be accomplished through interaction with an interface, such as a command line interface (CLI) or the like. A user can thus input a command specifying a value for one or more features through the interface and the features may be configured accordingly at the network device.

As may be imagined, configuring such network devices can be time consuming and complex, as individual commands must be entered in order to (re)configure the myriad features of the network device. Additionally, complicating such configuration is the fact that many of the interfaces for configuration of a network device are what are termed "additive," meaning that if it is desired to remove a feature (e.g., a command) from a running (e.g., existing) configuration, a command usually needs to be made to negate the existing feature.

Given these methods and limitations for configuration, the configuration of features of a network device is complex and time consuming, especially where a large number of features are involved. Moreover, in some cases the only way to reconfigure a device completely (or substantially) is either to carefully negate, or replace, every existing command (a practical impossibility in most circumstances), or to overwrite a startup configuration and reload the network device. As may be imagined, this is a massively disruptive process that can take a large amount of time depending on the device and configuration desired.

To aid in the configuration of network devices and attempt to ameliorate these issues, providers (e.g., manufacturers or software providers) of these network devices introduced configuration sessions. A configuration session allows configuration changes to be made in a temporary location. The configuration session can then be "committed" to replace a configuration running on the network device (the "running" or "current" configuration) with the configuration defined in the session (the "session" configuration).

A configuration session may include an ancestor configuration and a session configuration. To illustrate in more detail, when a configuration session is initiated the configuration session may be assigned a unique name and associated with a memory location or space. At the time the configuration session is initiated, the current configuration running on the device at that time may be referenced in the configuration session as the "ancestor" or "initial running" configuration with respect to that configuration session. If the current running configuration is modified subsequently to the initiation of that configuration session, a copy (or snapshot) of (at least the modified portion of) the current running configuration (e.g., at the time the configuration session was initiated) can then be saved as the ancestor configuration in the memory location associated with the configuration session. For example, if (at least a portion) of the configuration is modified during the configuration session, the corresponding (portion of) the current running configuration can be copied to the ancestor configuration in the memory location associated with the configuration session.

The configuration session thus allows configuration changes to be made to a configuration (e.g., the configuration at the time the configuration session was initiated as included in the ancestor configuration) in a session configuration (e.g., configuration changes in the session configuration are relative to the ancestor configuration associated with the initial running configuration) without altering the actual running configuration of the network device. In other words, configuration commands may be executed against this session configuration to alter this session configuration using a configuration interface (e.g., a CLI) without changing the running configuration of the network device. Thus, a configuration session can be entered, modified, or exited at any time without impacting a currently running system configuration.

At some point then, a user may commit the session configuration (e.g., when the user is done entering configuration commands). When the session configuration is committed (e.g., a user indicates that they wish to configure the network device according to the configuration session), the currently running configuration on the network device is replaced with the session configuration, which includes any changes in configuration made during the configuration session (e.g., any configuration commands entered as part of the configuration session) relative to the ancestor configuration (the running configuration at the time the session was initiated).

While the use of these types of configuration sessions may alleviate some of the problems with respect to configuring devices, these methods of device configuration are not without problems of their own. In the main, these problems relate to issues of synchronization between various configurations of the network device. Namely, in most cases implementations of configuration sessions overwrite the current configuration of the network device with the session configuration at the time the configuration session is committed. Thus, any changes that were made to the running configuration on the network device between the time a configuration session was initiated and when the configuration session was committed, may be lost. If different configuration sessions modify different features, the later session might override changes from an earlier session, and if a rollback (e.g., to a previous configuration state) is performed, it may override the configuration changes from a previous session.

These issues are exacerbated by the fact that many providers of network devices allow multiple configuration sessions to be ongoing simultaneously, while also allowing configuration changes to be made (e.g., in real time) through the regular configuration interface on the device itself. Accordingly, when a configuration session is committed, any changes made to the running configuration on the device between the time the configuration session was initiated and the time the session was committed will be overwritten, and thus lost. Additionally, from a user standpoint, no alert is given to a user (e.g., an administrator, a user who initiated a configuration session, etc.) that configuration changes may be overwritten. This is typically undesirable behavior.

What is desired then, is to allow configuration changes to be merged into a currently running configuration and to determine when such configuration changes may conflict to provide a user with such information.

To illustrate in more detail, it is both desired to minimize conflicts—the configuration of different features, or the same feature configured on different entities (such as different interfaces), should not conflict—while both minimizing implementation complexity and maximizing performance of such configuration changes. Certain previous approaches to merging configurations do not satisfy such goals (among others). In particular, merging configurations based on the underlying (i.e., binary) data structures used to store the configuration of such features in memory is both complex and relatively non-performant, while using a standard text based merge may not adequately address or resolve conflicts that occur (i.e., may not minimize conflicts).

To address those desires, among others, embodiments may perform a merge between an ancestor configuration, a session configuration and a current configuration of a network device based on save blocks. These save blocks may be a structured configuration model representing features to be configured. In this manner, by utilizing these save blocks as the basis for the configurations of features and for the merging of such configurations, embodiments may generally allow such merges to be performed substantially on a per feature basis and may further allow the merging to be performed in a manner that minimizes conflicts and implementation complexity while substantially improving the performance of those configuration merges.

Specifically, according to embodiments, a feature may be represented by one or more save blocks where a save block may include commands for configuring that feature. Accordingly, when a configuration session for a network device is initiated, an ancestor configuration may be obtained. In other words, the configuration of the network device at the time the configuration session is initiated may be stored. During the configuration session a user may modify the configuration (e.g., perform one or more commands against this ancestor configuration) to generate a session configuration. At some point during the configuration session, such as when a user indicates that the session configuration is to be committed, a current configuration of the network device may be obtained.

Each of the ancestor configuration, session configuration and current configuration may thus be associated with save blocks (e.g., data structures defining the configuration of a feature), where some of these save blocks may include commands associated with a feature that is being configured by the user during the configuration session. The set (i.e., one or more) of save blocks for each of the ancestor configuration, session configuration and current configuration can be merged to generate a merged configuration, also comprising a set of save blocks. The network device can then be configured according to the generated merged configuration. If conflicts (e.g., between the commands or configuration associated with the feature in the ancestor configuration, session configuration or current configuration) are identified during the generation of the merged configuration these conflicts may be presented to a user (e.g., for resolution by the user). For example, the user may be prevented from committing the session configuration until the identified conflicts are resolved.

In certain embodiments, the merge of these configurations may be accomplished by a three way merge algorithm applied to the save blocks of each of the ancestor configuration, session configuration and current configuration. More specifically, according to particular embodiments the save blocks of each of these configurations may be structured as a tree, such that each node of that tree is a corresponding save block. A recursive three way merge algorithm may be applied to start at the root node (save block) of each of the (tree for the) ancestor configuration, (tree for the) session configuration and (tree for the) current configuration. Accordingly, the merge may be performed between the trees on a node by node basis. In some embodiments, these save blocks may be of different types (e.g., there may be different types of save block data structures), thus the merge of a particular node of the trees of the ancestor configuration, session configuration and current configuration may be performed based on the type of save block corresponding to that node.

By performing merging of the ancestor, session and current configurations, embodiments may facilitate the simple and logical configuration of network devices on a feature by feature basis while preventing the overwriting of changes to the configuration of the device and allowing the identification and resolution of conflicting configurations when they occur.

Looking now at FIG. 1A, a computing system including one embodiment of a network device adapted for merging configurations is depicted. The system includes a network device 100 connected to one or more external entities (e.g., 102A, 102N). The network device 100 and the external entities 102 may be directly or indirectly connected to each other using any combination of wired or wireless connections and may communicate using one or more wireless or wired protocols. In embodiments there may be other network devices (or systems) (not shown) that facilitate communication between the devices.

Network device 100 may include persistent storage, memory (e.g., Random Access Memory), one or more processors (including a switch chip), and network interfaces (ports). Each port may or may not be connected to another device on a network (e.g., a server, a switch, a router, etc.). The switch chip includes hardware for determining how to route packets at the network device 100 (e.g., to which egress port a packet should be routed). The network device 100 may thus be adapted to receive packets via its ports and process the packet to determine whether to drop or route the packet, and to which port the packet should be routed.

The operation of network device 100 depends on the manner in which network device 100 is configured. For example, how the network device 100 makes the determination of whether to drop the packet, or send the packet to another device on the network may depend, in part, on whether the network element is a layer-2 (L2) switch or a layer-3 (L3) switch (also referred to as a multi-layer switch), which may perform at least some functions of a router. If the network device 100 is operating as an L2 switch, the network element may use a destination Media Access Control (MAC) address along with a forwarding table to determine out of which port to send the packet. If the network device 100 is operating as a L3 switch, the network device 100 may use the destination Internet Protocol (IP) address of a packet along with a routing table to determine out of which port to send the packet, and includes the ability to write the MAC address of the next device to receive the packet in place of its own MAC address (which the last device to send the packet wrote) in the L2 information encapsulating the packet. If the network device 100 is a multi-layer switch, the multi-layer switch includes functionality to process packets using both MAC addresses and IP addresses.

External entity 102 may be, or may execute on, any type of computing system that is configured to interact with the network device 100. For example, the external entity 102 may be a desktop computer or terminal operated by a network administrator or other type of user (e.g., may be a configuration console or the like). Users at these external network devices 102 may desire to access configuration data on features configured at the network device or otherwise manage or configure (collectively configure) network device 100 (e.g., such that network device 100 performs in a desired fashion).

Embodiments of the network device 100 offer the ability for a user at an external device 102 (or multiple users at multiple external entities 102) to perform configuration changes in, or to otherwise conduct, a configuration session. When the configuration session is committed (or at some time prior) the changes in the configuration session may be merged with the currently running configuration of the network device 100 at that time (e.g., when the configuration session is committed) and to determine when such configuration changes may conflict to provide a user (e.g., conducting the configuration session) with such information.

Figure 1B:
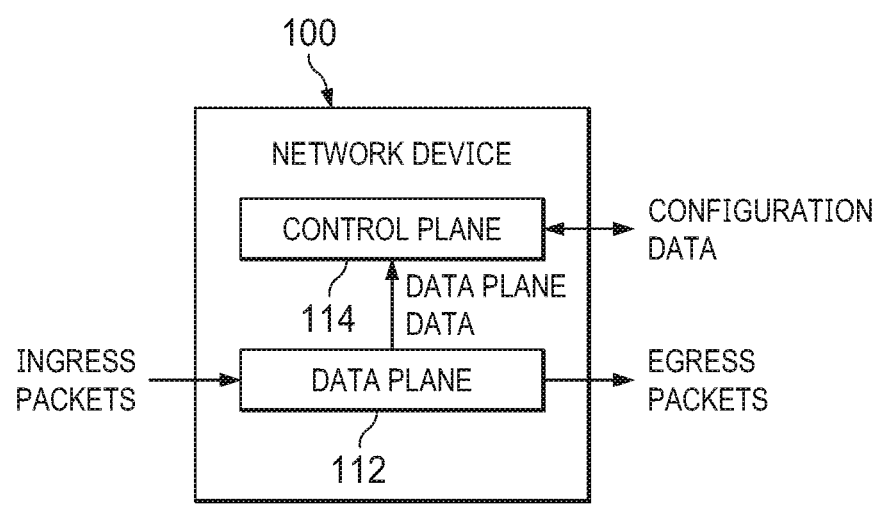
FIG. 1B is a block diagram of an embodiment of a network device for merging configurations.

Moving now to FIG. 1B, an embodiment of a network device adapted for merging configurations is depicted. The network device 100 includes a data plane 112 and a control plane 114. The data plane 112 is adapted to receive packets (ingress packets) via ports (not shown) of the network device 100, process the packets and, as appropriate, route packets (egress packets) via the ports. The data plane 112 is also adapted to gather data plane information and to provide this data plane information to the control plane 114. Data plane information includes, for example, network usage data, flow information based on the sampling of packets received by the data plane, information related to queue depths on ingress or egress buffers (not shown) in the data plane, other data traffic statistics or other types of data plane information.

Control plane 114 is adapted to manage the operation of the network device 100 (e.g., at least partially based on the data plane information received from data plane 112). More specifically, the control plane 114 is adapted to manage the operation of the data plane 112. The control plane 114 includes functionality to conduct configuration sessions based on received configuration data and to provide configuration data in accordance with such configuration sessions. According to embodiments, therefore, control plane 114 may conduct configuration sessions by storing an ancestor configuration (e.g., a running configuration of the network device 100 at, or close to, the time the configuration session was initiated), and maintain a session configuration for the configuration session by applying configuration commands received during the session to (e.g., a copy of) the ancestor configuration. The control plane 114 is thus adapted to perform a merge between the ancestor configuration and the session configuration of the configuration session and the current configuration of a network device 100 at the time the configuration session is committed. This merged configuration may be used to replace the current configuration on the network device 100 or a user may be notified that certain configuration changes may conflict such that a user may be made aware of such conflicts.

Figure 1C:
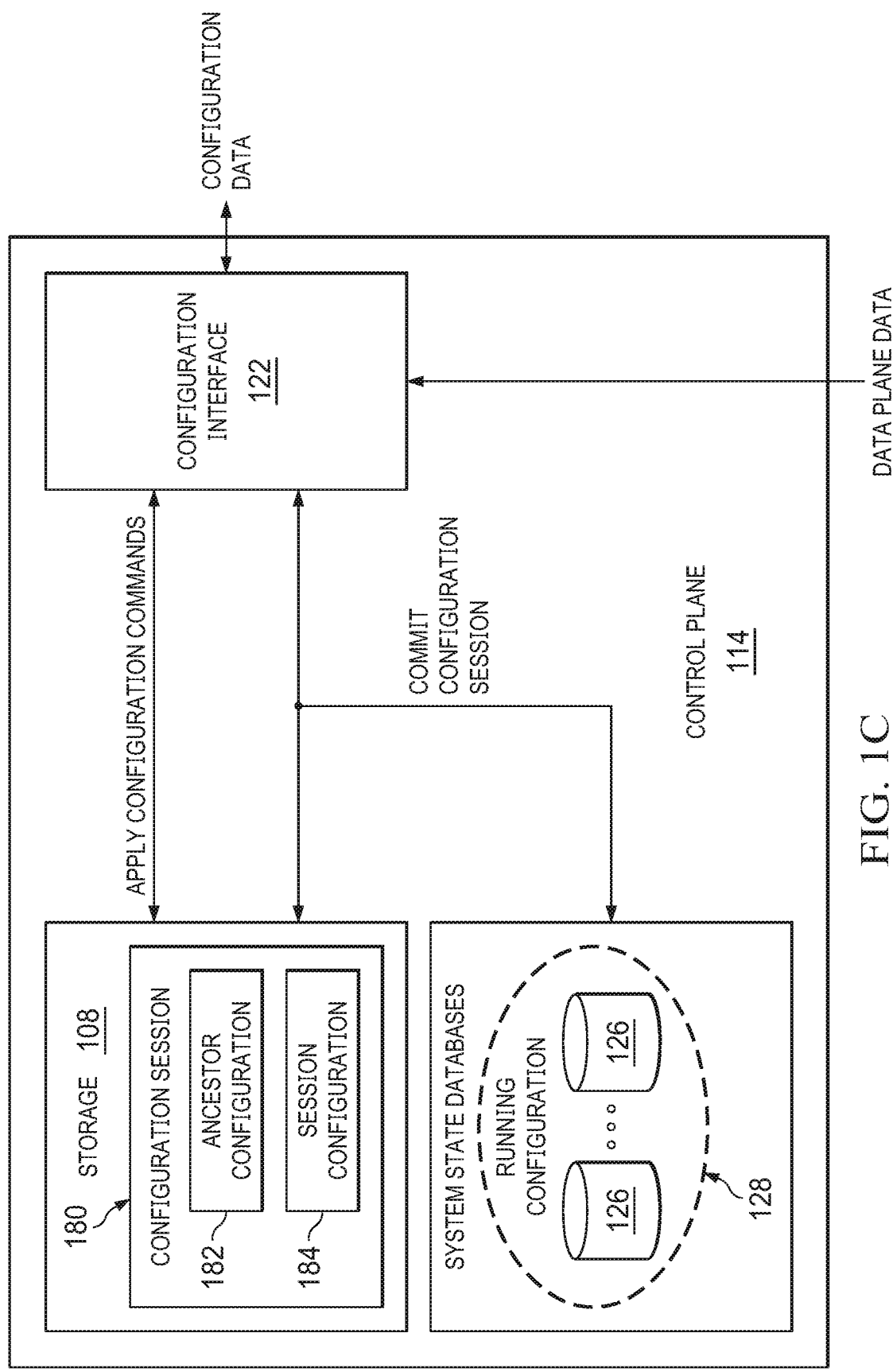
FIG. 1C is a block diagram of a control plane of embodiments of a network device for merging configurations.

Additional details about such a control plane are described with respect to the embodiment of a control plane of a network device depicted in FIG. 1C. Here, control plane 114 may include a configuration interface (or agent) 122 and one or more system state databases 126. The control plane 114 may also include other functionality to implement protocols, processes, or services of the network device, such as a routing information base agent, a forwarding information base agent, a simple network management protocol (SNMP) agent, etc.

System state databases 126 include any single or combination of shared or non-shared data stores (e.g., memories) at one or more locations in network device 100 that store the current (running) configuration 128 of the network device (e.g., values in data structures used, accessed, stored by, etc. any of the agents or functionality of the control plane 114) such that the running configuration 128 in system state databases 126 includes the values of the feature (e.g., variables or parameters) that are currently specified or configured for the network device (e.g., such as user names, passwords, interface definitions, addresses data, routing or forwarding table entries, or the like). The system state databases 126 store the aforementioned information in, for example, records or another data structure within the system state databases 126 (e.g. binary data structures) where these data structures may conform to a data model used by network device 100.

A user can thus initiate a configuration session 180 through configuration interface 122. When configuration session 180 is initiated, the running configuration 128 of the network device 100 at that time is stored as an ancestor configuration 182 in a memory space of storage 108 associated with that configuration session 180 (and may be assigned a unique name that a user can subsequently refer to when interacting with the configuration session 180 through configuration interface 122). A copy of that ancestor configuration 182 can then be used as the initial session configuration 184 for the configuration session 180.

Using the configuration interface 122 then, a user can issue configuration commands associated with the configuration session 180. These configuration commands for the configuration session can then be applied to session configuration 184 of the configuration session. The configuration session 180 thus allows configuration changes to be made to this session configuration 184 without altering the actual running configuration 128 of the network device 100 (which, as discussed, may be altered during the time configuration session 180 is ongoing). Accordingly, configuration session 180 can be entered, modified, or exited at any time without impacting currently running system configuration 128.

At some point then, a user may commit the configuration session 180. By committing the configuration session 180 the user is indicating that they wish to replace the running configuration 128 on the network device 100 with the session configuration 184 that includes the ancestor configuration 182 (the running configuration 128 at the time the session was initiated) plus any changes to the configuration made during the configuration session 180 (e.g., the changes in configuration caused by configuration commands issued through configuration interface 122 in association with configuration session 180).

As running configuration 128 at the time the user commits the configuration session 180 may be different from the running configuration 128 at the time the configuration session 180 was initiated (e.g., the running configuration 128 used as the ancestor configuration 182), when configuration session 180 is committed any changes made to the running configuration 128 on the device 100 between the time the configuration session 180 was initiated and the time the configuration session was committed may be overwritten (and thus lost).

According to embodiments, therefore, configuration interface 122 may be adapted to merge configuration changes from a configuration session 180 into a currently running configuration 128 and to determine when such configuration changes may conflict to provide a user with such information. In particular, embodiments may perform a three way merge between the ancestor configuration 182 (e.g., the running configuration 128 that existed at the time configuration session 180 was initiated), the session configuration 184 of the configuration session 180 including changes to that ancestor configuration 182 during the configuration session 180, and the current running configuration 128 existing at the time the configuration session 180 is committed. By performing this merging, embodiments may facilitate the simple and logical configuration of the network device 100 while preventing the overwriting of changes to the running configuration 128 of the device 100 and allowing the identification and resolution of conflicting configurations when they occur.

Figure 2:
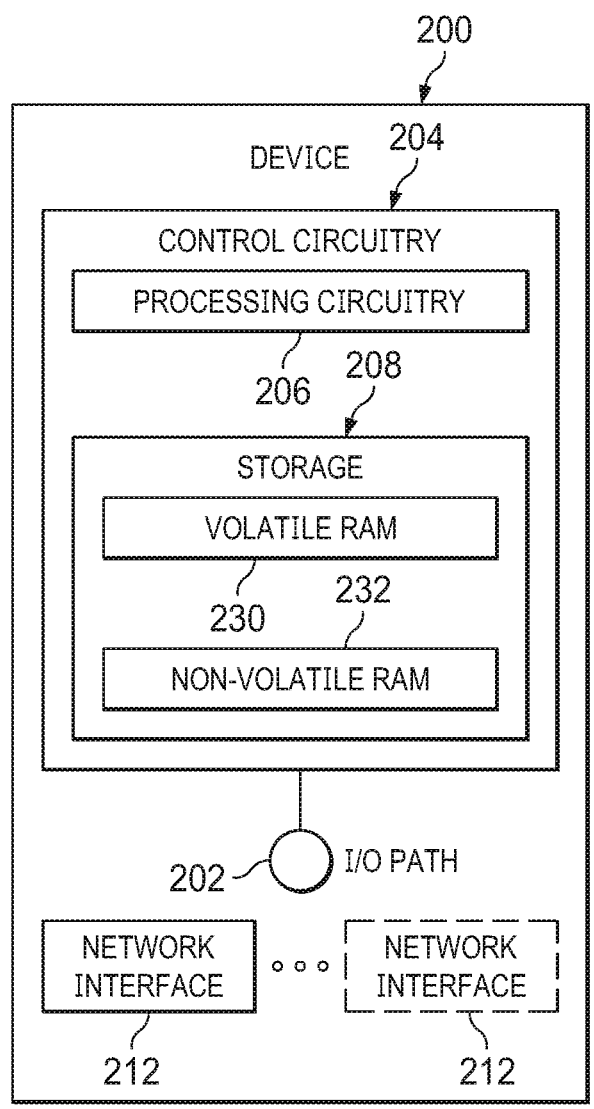
FIG. 2 is a block diagram depicting a general architecture of a network device for merging configurations.

FIG. 2 is a block diagram depicting a general architecture of a network device for performing merging in accordance with certain embodiments. Network device 200 may be a router, switch, server, or any other computing device that may be configured to control or process network traffic. The network device 200 may receive data, including packets from hosts (not shown), via an input/output (I/O) path 202. I/O path 202 may provide packet data to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces 212 to which other devices of a network (e.g., hosts) can be connected. These network interfaces 212 may be any type of network interface, such as an RJ45 ethernet port, a coaxial port, or a serial port such as RS232, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. As referred to herein, the phrase "memory", "electronic storage device," or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same. The running configuration of the device 200 may be stored in storage 208. This running configuration may include values specified or otherwise configured for one or more features of network device 200. For example, storage 208 may include system state databases that include data structures (e.g. binary data structures) comprising the values for these features.

Control circuitry 204 executes instructions for conducting configuration sessions for configuring the network device 200 and stores these configuration sessions, including an associated ancestor configuration and session configuration in storage 208. As the configuration session is conducted, the control circuitry 204 (e.g., instructions executing thereon) can execute received configuration commands for the configuration session against the session configuration to update the session configuration. The configuration commands can, for example, be adapted to configure values for certain features of the network device 200.

When the configuration session is committed, the control circuitry 204 is adapted to perform a merge between an ancestor configuration, a session configuration, and a current configuration of a network device. In one embodiment, such a merge is performed based on a data structure associated with a configuration model (referred to as a save block) where each of the save blocks represents (e.g., defines) the configuration of one or more features of the network device 200. Specifically, a save block may include a list of commands that define a configuration for the associated one or more features. A set of save blocks can thus be generated for the ancestor configuration, the session configuration, and the current running configuration of the network device 200.

A merged configuration can then be generated for the configuration session by the control circuitry 204 by performing a three way merge between the ancestor configuration, the session configuration, and the current running configuration using the generated save blocks for each of the ancestor configuration, the session configuration, and the current running configuration. The network device 200 can then be configured according to the generated merged configuration. If conflicts (e.g., between the commands or configuration associated with the feature in the ancestor configuration, session configuration or current configuration) are identified by control circuitry 204 during the generation of the merged configuration these conflicts may be presented to a user (e.g., for resolution by the user). For example, the user may be prevented from committing the session configuration until the identified conflicts are resolved.

Figure 3:
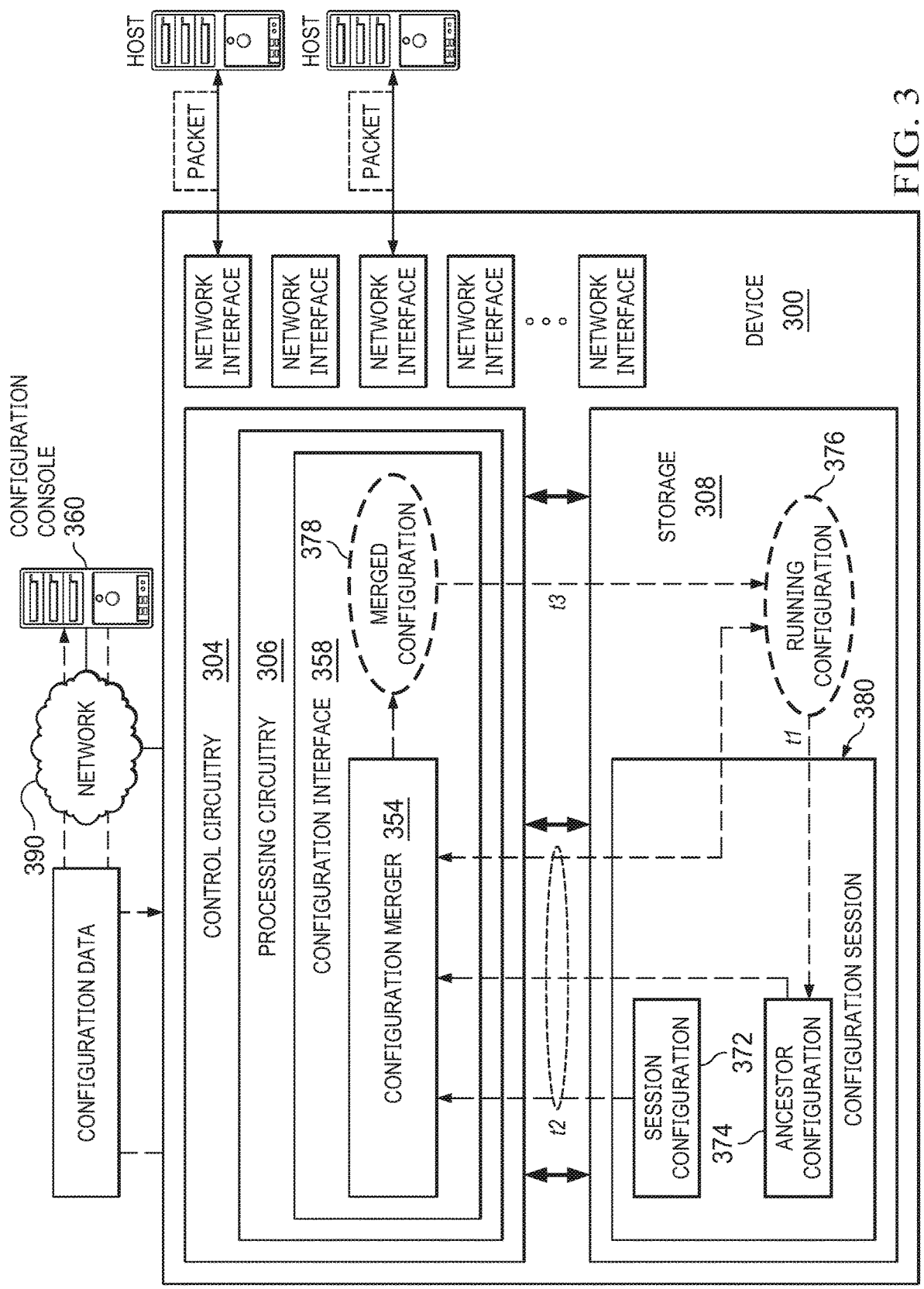
FIG. 3 is a block diagram depicting an example of an embodiment of a network device for merging configurations.

FIG. 3 is a more detailed depiction of an embodiment of a network system including a network device 300 and an external device such as a configuration console 360 coupled to the network device 300 over a communication network 390, where device 300 merges configurations when committing a configuration session. Specifically, configuration interface 358 (executing on processing circuitry 306 included in control circuitry 304) may be adapted to conduct a configuration session. Thus, a user at configuration console 360 thus initiates a configuration session 380 through configuration interface 358. When configuration session 380 is initiated, the running configuration 376 of the network device 300 at that time (t1) is stored as an ancestor configuration 374 in a memory space of storage 308 associated with that configuration session 380 (and may be assigned a unique name that a user can subsequently refer to when interacting with the configuration session 380 through configuration interface 358). A copy of that ancestor configuration 374 (e.g., running configuration from time t1) can then be used as the initial session configuration 372 for the configuration session 380.

Using the configuration interface 358 then, a user can issue configuration commands (e.g., configuration data) associated with the configuration session 380. These configuration commands for the configuration session can then be applied to session configuration 380 of the configuration session by the configuration interface 358. The configuration session 380 thus allows configuration changes to be made to this session configuration 372 without altering the actual running configuration 376 of the network device 300 (which may be altered during the time configuration session 380 is ongoing). Accordingly, configuration session 380 can be entered, modified, or exited by the user at the configuration console 360 at any time without impacting currently running system configuration 376.

At some point then (e.g., time t2), a user at the configuration console 360 may commit the configuration session 380. By committing the configuration session 380 the user is indicating that they wish to replace the running configuration 376 on the network device 300 with the session configuration 372 that includes the ancestor configuration 374 (the running configuration 376 at the time (t1) the session 380 was initiated) plus any changes to this configuration made during the configuration session 380 by a user issuing configuration commands at configuration console 360.

As running configuration 376 at the time (t2) the user commits the configuration session 380 may be different from the running configuration 376 at the time (t1) the configuration session 380 was initiated, configuration interface 358 may be adapted to merge configuration changes from a configuration session 380 into the currently running configuration 376 and to determine when such configuration changes may conflict to provide a user with such information. According to an embodiment, configuration interface 358 may therefore include configuration merger 354.

Configuration merger 354 is adapted to merge configurations associated with a configuration session 380 by performing a three way merge between the ancestor configuration 374 for the configuration session 380 (e.g., the running configuration 376 that existed at the time (t1) the configuration session 380 was initiated), the session configuration 372 of the configuration session 380 including changes to that ancestor configuration 374 during the configuration session 380, and the current running configuration 376 existing at the time (t2) the configuration session 380 is committed.

In particular, according to one embodiment, when the user commits the configuration session 380 (e.g., at time (t2)), the configuration merger 354 may obtain the session configuration 372 and the ancestor configuration 374 associated with the committed configuration session 380. Additionally, the configuration merger 354 can obtain the current running configuration 376 at that time (e.g., time t2 when the session is committed).

The configuration merger 354 can then generate save blocks for each of the ancestor configuration 374 (from time t1), the session configuration 372 and the currently running configuration 376 (from time t2). These save blocks may include a list of commands or other definitions that define or otherwise represent a configuration for one or more features of the network device 300. To generate the save blocks for a configuration the configuration merger 354 may, for example, evaluate the (e.g., binary) data structures including the configurations for the features as included in that configuration and generate the corresponding save blocks representing those configurations for those features. These save blocks can, for example, be formed according to a structured configuration model and include commands for those features adapted to configure (or represent the configuration of) those features as defined in that configuration. Accordingly, a corresponding set of save blocks can be generated for each of the ancestor configuration 374, the session configuration 372 and the currently running configuration 376.

Once configuration merger 354 generates the corresponding set of save blocks for each of the ancestor configuration 374, the session configuration 372 and the currently running configuration 376, the configuration merger 354 can merge the generated set of save blocks for each of the session configuration, the current configuration, and ancestor configuration to generate merged configuration 378. This merge can be accomplished using a merging algorithm such as a three way merge or the like. The resulting merged configuration 378 may therefore include a set of save blocks determined based on the merging of each of the set of save blocks for the session configuration 372, the current running configuration 376, and the ancestor configuration 374, where the save blocks of merged configuration 378 may include commands for those features adapted to configure (or represent the configuration of) those features resulting from such a merge. In some embodiments, the merge of the session configuration 372, current running configuration 376, and ancestor configuration 374 may be accomplished by applying the merge algorithm on a save block by save block basis, such that corresponding save blocks from each of the set of save blocks for the session configuration 372, current running configuration 376, and ancestor configuration 374 are merged to generate a corresponding save block of the set of save blocks for the merged configuration 378.

Once the merged configuration 378 is generated it can then be used to configure the network device (e.g., by replacing the running configuration 376 with the merged configuration 378 at time t3). In some embodiments, during the merge of the session configuration 372, current running configuration 376, and the ancestor configuration 374 the configuration merger 354 may determine any conflicts that may exist between each of these configurations. These conflicts may be identified to a user (e.g., through configuration console 360) such that a user may resolve such conflicts or take other action. For example, the merging of the configuration may be paused or the user may be prevented from committing the configuration session 380.

Figure 4A:
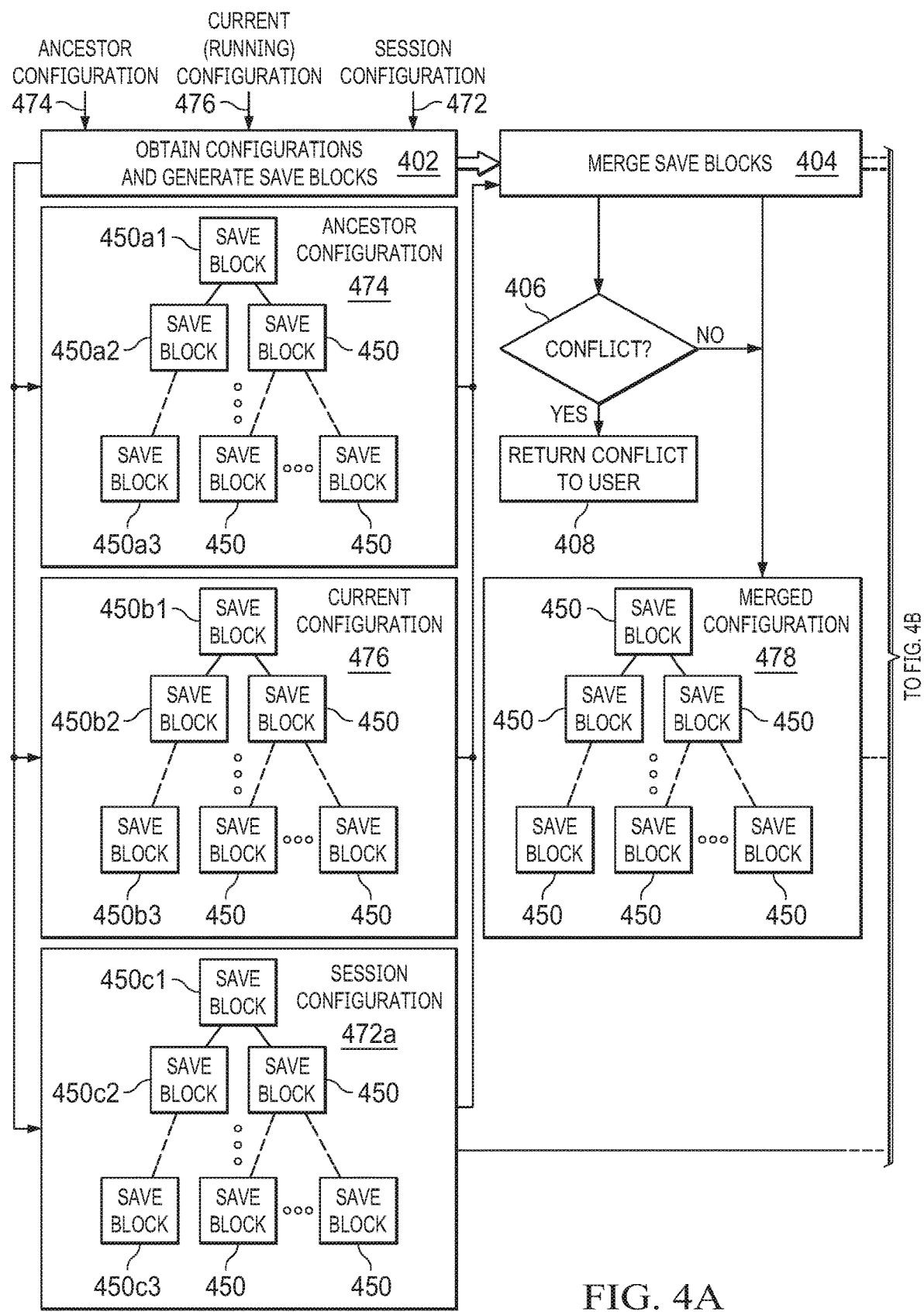
FIGS. 4A and 4B are a flow diagram of an embodiment of a method for merging configurations.
Figure 4B:
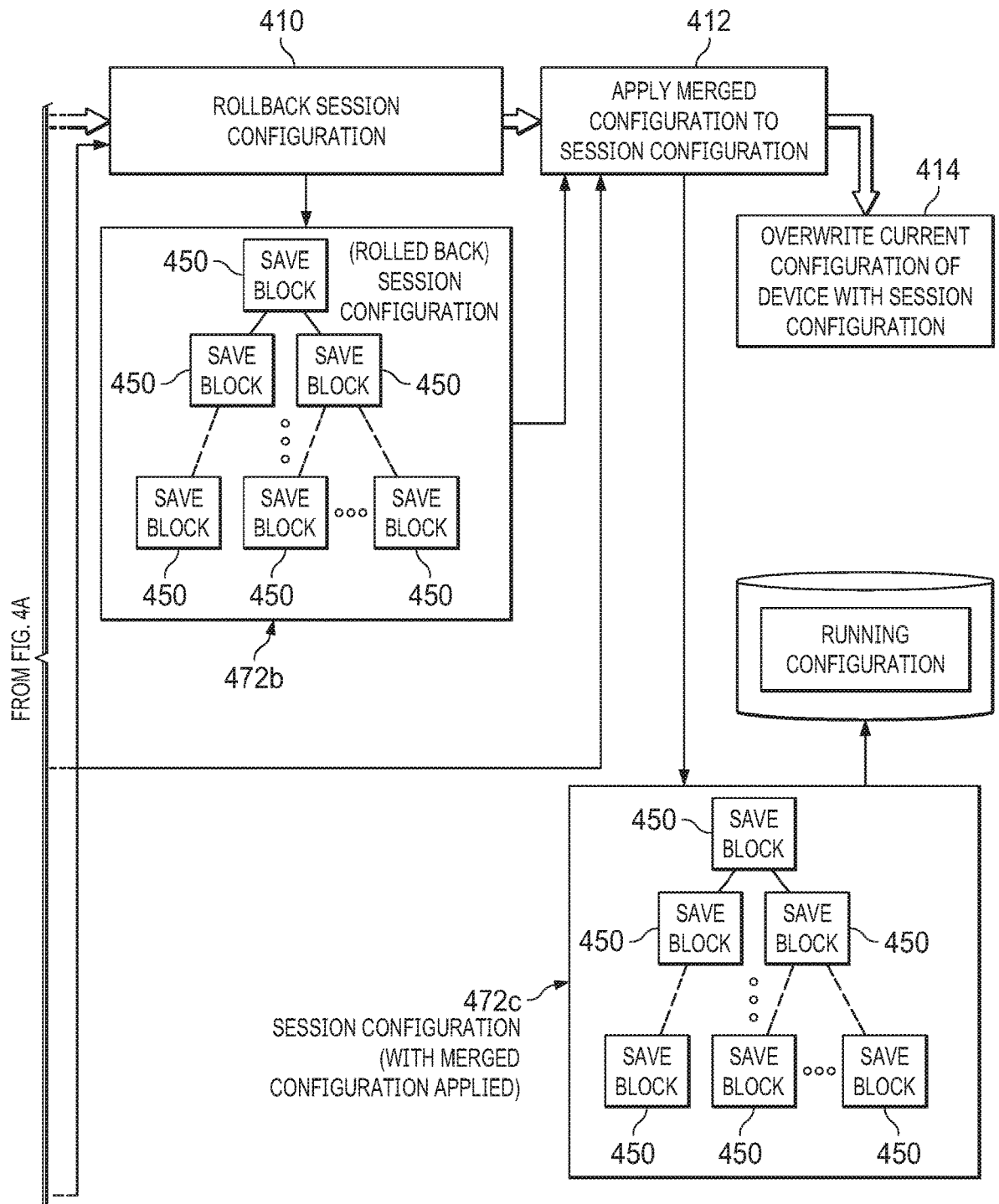

FIGS. 4A and 4B are a detailed depiction of an embodiment of a method for performing such a merge for a configuration session to generate a merged configuration and the application of a merged configuration to the running configuration of a network device. As discussed, a configuration session may be based on an ancestor configuration comprising the running configuration of the network device at the time the configuration session was initiated. During the configuration session a session configuration that includes the ancestor configuration modified according to any configuration changes made during the configuration session is generated. Accordingly, when a configuration session is committed (or at some other point where it is desired to merge configurations), this session configuration may be merged with the ancestor configuration and a current running configuration of the network device.

In one embodiment, then, the ancestor configuration 474 and session configuration 472 of the configuration session may be obtained, along with a current running configuration 476 of the network device, and a corresponding set of save blocks 450 for each of those configurations generated (STEP 402). Each of the save blocks 450 can thus include a list of commands or other definitions that define or otherwise represent a configuration for one or more features of the network device. To generate the save blocks for a configuration, a (e.g., binary) data structure including the configuration for a feature can be evaluated and a corresponding save block 450 representing the configurations for that feature generated. These save blocks 450, can, for example be formed according to a structured configuration model and include commands for those features adapted to configure (or represent the configuration of) those features as defined in that configuration. Moreover, these save blocks 450 may be orthogonal to one another (for a particular configuration) in certain embodiments, such that save blocks 450 of a set of save blocks for a particular configuration (e.g., ancestor configuration 474, session configuration 472 and current running configuration 476) may not overlap (e.g., may not include commands for the same feature, or define the same parameter or value for the same feature).

In some embodiments, the structured configuration model for save blocks 450 may define different types of save blocks. For example, in one embodiment there may be three types of save blocks defined, a "CommandSequence" save block, a "ModeCollection" save block and a "Mode" save block. A CommandSequence save block may include a set of commands associated with the configuration of a feature. ModeCollection and Mode save blocks may be save blocks for structuring, grouping or otherwise organizing save blocks. A ModeCollection may include (or references) a set of Mode save blocks, where all of the referenced Mode save blocks may be of the same type of mode. For example, each of the referenced save blocks may be children of the node comprising a ModeCollection save block in the case where a set of save blocks are structured as a tree. A Mode save block includes (or references) other save blocks of type CommandSequence or ModeCollection.

It may be useful to here describe examples of save blocks. Suppose for example, an ancestor configuration for a feature is:
    interface Ethernet1
      description foo
A session configuration for the same feature is:
    interface Ethernet1
      description foo
      no switchport
      ip address 10.1.1.1/24
And a current running configuration is:
    interface Ethernet1
      description bar
In this example, the corresponding save blocks for the ancestor configuration would be:
    GlobalConfigMode
      Mode 'interface Ethernet1'
      CommandSequence 'Arnet.intf'->['description foo']
The corresponding save blocks for the session configuration would be:
    GlobalConfigMode
      Mode 'interface Ethernet1'
      CommandSequence 'Arnet.intf'->['description foo']
      CommandSequence 'Ebra.switchport'->['no switchport']
      CommandSequence 'Ira.ipIntf'->['ip address 10.1.1.1/24']
And the corresponding save blocks for the running configuration would be:
    GlobalConfigMode
      Mode 'interface Ethernet1'
      CommandSequence 'Arnet.intf'->['description bar']

Accordingly, a corresponding set of save blocks 450 can be generated for each of the ancestor configuration 474, the session configuration 472 and the currently running configuration 476. In one embodiment, each of the sets of save blocks 450 for each of the session configuration 472, current configuration 476, and ancestor configuration 474 are structured as a tree, such that each node of the tree comprises a corresponding one of the set of save blocks 450 where each interior node of the tree has one or more child nodes that are also save blocks 450. Thus, each of the set of save blocks 450 for each of the configurations 472, 474, 476 may be structured as an identical, or substantially similar, tree structure with corresponding nodes (e.g., save blocks 450 that may pertain to the same feature or set of features or save blocks 450 associated with the same structuring, grouping or organization save blocks). For example, root node save block 450a1 of ancestor configuration 474 may correspond to root node save block 450b1 of current configuration 476 and root node save block 450c1 of session configuration 472; interior node save block 450a2 of ancestor configuration 474 may correspond to interior node save block 450b2 of current configuration 476 and interior node save block 450c2 of session configuration 472; leaf node save block 450a3 of ancestor configuration 474 may correspond to leaf node save block 450b3 of current configuration 476 and leaf node save block 450c3 of session configuration 472, etc.

Once the corresponding set of save blocks 450 are generated for each of the ancestor configuration 474, the session configuration 472 and the currently running configuration 476, these generated sets of save blocks 450 for each of the configurations 472, 474, 476 (e.g., structured as a tree) can be merged to generate a merged configuration 478 (STEP 404). The merge may be accomplished by generating differences between the ancestor configuration 474, the session configuration 472 and the currently running configuration 476 at the save block level.

In one embodiment, this merge can be accomplished using a merging algorithm such as a three way merge or the like. For example, in cases where the sets of save blocks 450 for each of the configurations are structured as a tree, a recursive three way merger may be performed on the save blocks 450 of the ancestor configuration 474, the session configuration 472 and the currently running configuration 476 starting at the root node (e.g., save blocks 450$a$1, 450$b$1, 450$c$1) of the each of the trees of save blocks for each of the configurations 472, 474, 476 and recursing through the trees of save blocks 450 for each configuration to compare the corresponding save blocks 450 for each of the configurations.

Thus, the merge of the set of save blocks 450 (e.g., structured as a tree) may be performed on a node by node basis by comparing the corresponding save blocks 450 in each of the set of save blocks for each of the ancestor configuration 474, the session configuration 472 and the currently running configuration 476 (e.g., save blocks 450$a$2, 450$b$2 and 450$c$2 may be compared, save blocks 450$a$3, 450$b$3, 450$c$3 may be compared to one another). This merged configuration 478 may thus comprise a set of save blocks 450, each of the save blocks 450 of the merged configuration 478 corresponding to (and resulting from the merge of) corresponding save blocks 450 of the ancestor configuration 474, the session configuration 472 and the currently running configuration 476.

In some embodiments, it can be determined if there are any conflicts when merging save blocks 450 from the different configurations 472, 474, 476 (STEP 406). If such conflicts are identified they may be returned to the user (Y branch of STEP 406 and STEP 408), and in some embodiments the merge of the configurations 472, 474, 476 may be stopped, or the committing of the session configuration 472 otherwise halted. If no conflicts are identified the merged configuration 478 may be generated (N branch of STEP 406).

Such conflicts may arise in circumstances where, for example, a corresponding save block 450 from the session configuration 472 and the currently running configuration 476 both differ from the corresponding save block 450 of the ancestor configuration 474 (e.g., a command or value for a feature differs between the session configuration 472 and the ancestor configuration 474 and the command or value for that same feature differs between the currently running configuration 476 and the ancestor configuration 474). Other conflicts may arise if save blocks 450 or collections of save blocks 450 are present (or not present) or different between the configurations 472, 474, 476. It will be noted here that these examples of conflicts are given without loss of generality and there may be additional, fewer or different conflicts that may for example, be defined with respect to the particular embodiment of merge performed, or specified or configured by a user.

In certain embodiments, the comparison between corresponding save blocks 450 of the ancestor configuration 474, the session configuration 472 and the currently running configuration 476 may be performed based on the type of the save block 450 being compared. For example, when merging save blocks 450 from the configurations 472, 474, 476 if the corresponding save blocks 450 from the configurations 472, 474, 476 being compared are of the CommandSequence type the set of commands for the feature in the save block 450 from the session configuration 472 can be compared to the set of commands for the feature of the corresponding save block 450 of the current running configuration 476. If the set of commands for the features from these save blocks 450 are different, the set of commands for the feature of save block 450 of session configuration 472 may be compared to the corresponding save block 450 from the ancestor configuration 474, and the set of commands for the feature of save blocks 450 of current running configuration 476 may also be compared to the corresponding save block 450 from the ancestor configuration 474.

If both the (set of commands of) save block 450 of session configuration 472 and the (set of commands of) save block 450 of current running configuration 476 are different from the (set of commands of) corresponding save block 450 of the ancestor configuration 474 this can be identified as a conflict (e.g., and identified to a user). Otherwise, the set of commands for the feature (e.g., in save block 450 of session configuration 472 or save block 450 of current running configuration 476) that differ from the corresponding save block 450 of the ancestor configuration 474 may be obtained and used to form corresponding save block 450 of merged configuration 478. If there are no such differences the set of commands for the feature from the save block 450 of the session configuration 472 may be used to form corresponding save block 450 of merged configuration 478.

As another example, recall that a ModeCollection type of save block may be for structuring, grouping or otherwise organizing save blocks 450 and may thus include or reference such save blocks 450. Thus, a comparison of corresponding ModeCollection save blocks may be based on the save blocks 450 included or referenced in the corresponding ModeCollection save blocks 450 being compared. For example, if a ModeCollection save block 450 of the running configuration 476 (e.g., the save block being compared or a save block 450 referenced or included in a ModeCollection save block being compared) is not present in the save blocks 450 of the session configuration 472, it can be determined if that save block 450 is present in the save blocks 450 of the ancestor configuration 474. If that save block 450 is present in the ancestor configuration 474, and the save block 450 of the running configuration 476 is not the same as that corresponding save block 450 of the ancestor configuration 474, a conflict can be identified. In cases where that save block 450 of the running configuration 476 and the ancestor configuration 474 are the same, it may not be added to the save blocks of the merged configuration 478.

Similarly, when a ModeCollection save block 450 is present in save blocks 450 of the session configuration 472 it can be determined if that save block 450 is present in save blocks 450 of the running configuration 476. If that save block 450 is not present in save blocks 450 of the running configuration 476 it can be determined if a corresponding save block 450 is present in the ancestor configuration 474. If that save block 450 is present in the ancestor configuration 474, and the save block 450 of the session configuration 472 is not the same as that corresponding save block 450 present in the ancestor configuration 474, a conflict can be identified. Here, in cases where save block 450 of the session configuration 472 and the ancestor configuration 474 are the same, it may be added to the save blocks 450 of the merged configuration 478.

If a ModeCollection save block 450 is present in both the save blocks 450 of the session configuration 472 and the save blocks 450 of the running configuration 476 it can be determined if that save block 450 is present in the save blocks 450 of the ancestor configuration 474. If the corresponding ModeCollection save block 450 is present in the ancestor configuration 474, a recursive merge can continue on each of the save blocks referenced by that ModeCollection save block 450. If, however, a corresponding ModeCollection save block 450 is not present in the ancestor configuration 474, this may indicate that the save block 450 is new. In this case, if the corresponding ModeCollection save block 450 is different between the session configuration 472 and the running configuration 476 a conflict can be identified. Otherwise, that ModeCollection save block 450 of the session configuration 472 may be included in the save blocks 450 of the merged configuration 478.

In some embodiments, corresponding Mode save blocks 450 in different configurations 472, 474, 476 may be considered the same if one or more of the same commands or comment, or a particular type of command or comment of the corresponding Mode save blocks 450 is the same. For example, two Mode save blocks 450 may be considered the same if they have the same commands (e.g., an "enter" command) associated with a same ModeCollection save block. In some embodiments, a Mode save block 450 may include a comment or description, and reference a set of save blocks 450 (e.g., a ModeCollection save block). Thus, in one embodiment, to merge a corresponding Mode save block 450 of session configuration 472, running configuration 476 and ancestor configuration 474 to determine a corresponding save block 450 of the merged configuration 478, the comment portions of the corresponding Mode save blocks 450 can be merged to determine a comment portion of the resulting save block to be included in the merged configuration 478. Additionally, the reference portion (e.g., the set of referenced save blocks) of the corresponding Mode save blocks 450 can also be merged to determine the set of save blocks 450 for the referenced save blocks of the resulting Mode save block 450 to be included in the merged configuration 478. The merge of the corresponding Mode blocks 450 referenced save blocks 450 may be accomplished substantially as described above with respect to the merging of save blocks in a ModeCollection save block.

A merge for a comment portion of a Mode save block 450 may be determined in a similar manner to that described with respect to a CommandSequence save block 450. Specifically, if the comment portion of the Mode save block 450 from the session configuration 472 is different than the comment portion of the Mode save block 450 of the running configuration 476, the comment portion of the corresponding save block 450 of the ancestor configuration 474 may be utilized to determine which one of the save block 450 from the session configuration 472 or the save block 450 from the running configuration 476 includes the different comment portion (or if both of those save blocks 450 include a changed comment portion). If the comment portion of both the save blocks 450 from the session configuration 472 and the running configuration 476 changed relative to the ancestor configuration 474 then a conflict may be identified. Otherwise, the comment portion of the save block 450 of the running configuration 476 or the session configuration 472 that changed relative to the ancestor configuration 474 may be used to form the corresponding save block 450 of the merged configuration. If the comment portions of all the corresponding save blocks 450 from the session configuration 472, ancestor configuration 474 and running configuration 476 are all the same then the comment portion of the save block 450 of the session configuration 472 may be utilized to form the corresponding save block of the merged configuration 478.

To illustrate a merge with respect to the above example, the difference (e.g., any additions or modifications) between the save block for the ancestor configuration and the session configuration may be:
GlobalConfigMode
 Mode 'interface Ethernet1'
  CommandSequence 'Ebra.switchport'->['no switchport' ]
  CommandSequence 'Ira.ipIntf'->['ip address 10.1.1.1/24']

These determined differences can be applied to the running configuration by merging these determined differences with the (e.g., corresponding save block of) the running configuration. In this case then, the application (merging) of the determined differences (between the save block for the ancestor configuration and the session configuration) and the (save block of the) running configuration yields the following, which may be considered a merged save block:
GlobalConfigMode
 Mode 'interface Ethernet1'
  CommandSequence 'Arnet.intf'->['description bar']
  CommandSequence 'Ebra.switchport'->['no switchport' ]
  CommandSequence 'Ira.ipIntf'->['ip address 10.1.1.1/24']

Thus, once the sets of save blocks 450 for each of the configurations session session configuration 472, ancestor configuration 474 and current running configuration 476 are merged to generate a merged configuration 478, the session configuration 472a may be rolled back to generate a rolled back session configuration 472b (STEP 410). Such a rolled back session configuration 472b may be substantially similar to ancestor configuration 474. In one embodiment, only the save blocks 450 (e.g., nodes or roots of the tree structure of session configuration 472a) that have been modified during the configuration session may be returned to the state at the beginning of the configuration session (e.g., to correspond with ancestor configuration 474).

The determined merged configuration 478 can then be applied to the rolled back session configuration 472b (STEP 412) by merging the save blocks 450 of the merged configuration 478 with the corresponding save blocks 450 of the rolled back session configuration 472b. The resulting session configuration 472c (e.g., which comprises the merged configuration 478) can then be used to configure the network device by replacing the (current) running configuration of the network device with that session configuration 472c (STEP 414).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure.

Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for configuring a network device, comprising:
    obtaining an ancestor configuration of a network device, wherein a configuration session was initiated using the ancestor configuration and the ancestor configuration is associated with a first time;
    obtaining a session configuration of the network device, wherein the session configuration is based on the ancestor configuration and is configured during the configuration session;
    obtaining a current configuration of the network device associated with a second time;
    generating a set of save blocks for each one of the session configuration, the current configuration, and the ancestor configuration, wherein each of the session configuration, current configuration and ancestor configuration define structured configuration models associated with features of the network device and generating the set of save blocks for each configuration comprises evaluating the structured configuration model of that configuration to form the set of save blocks representing configurations for the features defined by that configuration such that at least one of the set of save blocks generated for the session configuration comprises a first command for configuring a feature on the network device, at least one of the set of save blocks generated for the current configuration comprises a second command for configuring the feature on the network device, and at least one of the set of save blocks generated for the ancestor configuration comprises a third command for configuring the feature on the network device;
    merging the set of save blocks for the session configuration, the set of save blocks for the current configuration, and the set of save blocks for the ancestor configuration based on a comparison of the set of save blocks for the session configuration, the set of save blocks for the current configuration, and the set of save blocks for the ancestor configuration to generate a merged configuration comprising a set of save blocks, wherein the merging is based on the first command, second command, and third command for configuring the feature, and the set of save blocks of the merged configuration comprises at least one save block comprising a command for configuring the feature on the network device; and
    configuring the network device according to the merged configuration by altering the current configuration of the network device based on the command of the at least one save block of the merged configuration.

2. The method of claim 1, further comprising:
    identifying a conflict between the command associated with the feature in the ancestor configuration, the session configuration, or the current configuration based on the generation of the merged configuration; and
    presenting the conflict to a user.

3. The method of claim 1, wherein the set of save blocks for each of the session configuration, the current configuration, and the ancestor configuration are structured as a tree such that each node of the tree comprises a corresponding one of the set of save blocks, and the merge is a recursive merge starting with a root node of each tree.

4. The method of claim 3, wherein the merge is a three way merge.

5. The method of claim 3, wherein the merge of each of the set of save blocks for the session configuration, the current configuration, and the ancestor configuration is performed on a node by node basis.

6. The method of claim 5, wherein the merge of each node of the tree is based on a type of the save block corresponding to that node.

7. The method of claim 1, wherein the second time corresponds to a commit of the configuration session.

8. The method of claim 1, wherein configuring the network device according to the merged configuration comprises rolling back the session configuration.

9. The method of claim 8, wherein configuring the network device according to the merged configuration further comprises:
    merging the merged configuration with the rolled back session configuration; and overwriting the current configuration at the network device with the session configuration.

10. A configuration system, comprising:
    a processor;
    a data store storing an ancestor configuration of a network device from a first time associated with an initiation of a configuration session, a current configuration from a second time associated with a commit of the configuration session, and a session configuration defined during the configuration session, wherein each of the ancestor configuration, current configuration and session configuration define structured configuration models associated with features of the network device, and wherein
    the ancestor configuration comprises a first tree, each node of the first tree comprising a save block defined based the structured configuration model associated with the ancestor configuration and at least one save block of the first tree comprises a first command associated with a feature,
    the current configuration comprises a second tree defined based on the structured configuration model associated with current configuration, each node of the second tree comprising a save block and at least one save block of the second tree comprises a second command associated with the feature, and
    the session configuration comprises a third tree defined based on the structured configuration model associated with the session configuration, each node of the third tree comprising a save block and at least one save block of the third tree comprises a third command associated with the feature; and
    a non-transitory computer readable medium, comprising instructions for:
    generating a merged configuration comprising a fourth tree, each node of the fourth tree comprising a save block determined by merging the ancestor configuration, the current configuration and the session configuration, and at least one save block of the fourth tree comprises a command associated with the feature wherein the merging comprises merging the first command, second command, and third command associated with the feature, and wherein merging the ancestor configuration, the current configuration and the session configuration comprises comparing save blocks of the ancestor configuration, current configuration and session configuration by applying a recursive three way merge to merge save blocks of the first tree of the ancestor configuration, save blocks of the second tree of the current configuration and save blocks of the third tree of the session configuration on a node by node basis; and configuring the network device according to the merged configuration when no conflict is identified while merging the ancestor configuration, the current configuration, and the session configuration, wherein configuring the network device comprises altering the current configuration of the network device based on at least one save block of the merged configuration.

11. The configuration system of claim 10, wherein the instructions are further for presenting a conflict to a user when the conflict is identified while merging the ancestor configuration, the current configuration, and the session configuration.

12. The configuration system of claim 10, wherein the instructions are further for:
rolling back the session configuration;
merging the merged configuration with the session configuration; and
configuring the network device according to the rolled back session configuration to configure the network device according to the merged configuration.

13. The configuration system of claim 10, wherein the merge of each node of the first tree, second tree and third tree is based on a type of save block corresponding to that node.

14. The configuration system of claim 10, wherein the merged configuration is generated in response to a commit of the configuration session.

15. A non-transitory computer readable medium, comprising instructions for:
obtaining an ancestor configuration of a network device associated with a configuration session initiated at a first time;
obtaining a session configuration associated with the configuration session, wherein the session configuration is based on the ancestor configuration and is configured during the configuration session;
obtaining a current configuration of the network device associated with a second time;
generating a set of save blocks for each one of the session configuration, the current configuration, and the ancestor configuration, wherein each of the session configuration, current configuration and ancestor configuration define structured configuration models associated with features of the network device and generating the set of save blocks for each configuration comprises evaluating the structured configuration model of that configuration to form the set of save blocks representing configurations for the features defined by that configuration such that at least one of the set of save blocks generated for the session configuration comprises a first command for a first configuration or a second configuration of a feature of the network device, at least one of the set of save blocks generated for the current configuration comprises a second command for the first configuration or the second configuration of the feature of the network device, and at least one of the set of save blocks generated for the ancestor configuration comprises a third command for the first configuration or the second configuration of the feature of the network device;

merging the set of save blocks for the session configuration, the set of save blocks for the current configuration, and the set of save blocks for the ancestor configuration based on a comparison of the set of save blocks for the session configuration, the set of save blocks for the current configuration, and the set of save blocks for the ancestor configuration to generate a merged configuration comprising a set of save blocks, wherein the merging is based on the first command, second command, and third command and the set of save blocks of the merged configuration comprises either the first configuration or the second configuration of the feature on the network device; and configuring the network device according to the merged configuration when no conflict is identified while merging the set of save blocks for each of the session configuration, the current configuration, and the ancestor configuration by altering the current configuration of the network device based on at least one save block of the merged configuration.

16. The non-transitory computer readable medium of claim 15, wherein the second configuration is a different configuration for the feature than the first configuration.

17. The non-transitory computer readable medium of claim 15, where the merging of the set of save blocks is a recursive three way merge.

18. The non-transitory computer readable medium of claim 15, wherein merging the set of save blocks for each of the session configuration, the current configuration, and the ancestor configuration comprises merging corresponding save blocks from each of the set of save blocks for the session configuration, the current configuration, and the ancestor configuration.

19. The non-transitory computer readable medium of claim 18, wherein a corresponding save block from the session configuration, the current configuration, and the ancestor configuration comprises a command associated with the first configuration or the second configuration for the feature.

20. The non-transitory computer readable medium of claim 18, further comprising instructions for identifying a conflict based on the first configuration and the second configuration in the ancestor configuration, the session configuration, or the current configuration when merging the sets of save blocks for each of the session configuration, the current configuration, and the ancestor configuration.

* * * * *